(12) United States Patent
Takeda et al.

(10) Patent No.: US 10,102,635 B2
(45) Date of Patent: Oct. 16, 2018

(54) METHOD FOR MOVING OBJECT DETECTION BY A KALMAN FILTER-BASED APPROACH

(71) Applicant: SONY CORPORATION, Tokyo (JP)

(72) Inventors: Hiroyuki Takeda, San Jose, CA (US); Mohammad Gharavi-Alkhansari, San Jose, CA (US)

(73) Assignee: Sony Corporation, Tokyo (JP)

( * ) Notice: Subject to any disclaimer, the term of this patent is extended or adjusted under 35 U.S.C. 154(b) by 143 days.

(21) Appl. No.: 15/067,078

(22) Filed: Mar. 10, 2016

(65) Prior Publication Data
US 2017/0263005 A1   Sep. 14, 2017

(51) Int. Cl.
*G06K 9/00*   (2006.01)
*G06T 7/20*   (2017.01)

(52) U.S. Cl.
CPC ........ *G06T 7/2006* (2013.01); *G06K 9/00342* (2013.01); *G06K 9/00711* (2013.01); *G06T 7/208* (2013.01)

(58) Field of Classification Search
CPC ............ G06K 9/00342; G06K 9/00711; G06T 7/2006; G06T 7/208
See application file for complete search history.

(56) References Cited

U.S. PATENT DOCUMENTS

| | | |
|---|---|---|
| 8,009,918 B2 | 8/2011 | Van Droogenbroeck et al. |
| 8,456,528 B2 | 6/2013 | Brown et al. |
| 2003/0123703 A1 | 7/2003 | Pavlidis et al. |
| 2011/0196820 A1* | 8/2011 | Yuan ............... G05B 23/0221 706/52 |
| 2015/0022698 A1 | 1/2015 | Na et al. |

FOREIGN PATENT DOCUMENTS

WO   2005114579 A1   12/2005

OTHER PUBLICATIONS

Zajdel, Wojciech, Ali Taylan Cemgil, and Ben JA Krose. "Online multicamera tracking with a switching state-space model." Pattern Recognition, 2004. ICPR 2004. Proceedings of the 17th International Conference on. vol. 4. IEEE, 2004. (Year: 2004).*
Cemgil, Ali Taylan, et al. "On tempo tracking: Tempogram representation and Kalman filtering." Journal of New Music Research 29.4 (2000): 259-273. (Year: 2000).*

(Continued)

*Primary Examiner* — Nirav G Patel
(74) *Attorney, Agent, or Firm* — Haverstock & Owens LLP

(57) ABSTRACT

Segmentation is the process of partitioning an image into regions under certain rules. One implementation is to separate human objects that appear in a sequence of images (video) from the background. The goal is to find humans and segment them out in real-time, fully automatic (with no user input), and the result is produced immediately after a new image is captured. Once the segmentation process is started, the method is constantly learning (or updating) the decision rule for segmenting out human objects from the background by itself. Moving object detection by a Kalman filter-based approach roughly detects the region where moving objects are present.

21 Claims, 6 Drawing Sheets

(56) References Cited

OTHER PUBLICATIONS

Zheng, Yanli, and Mark Hasegawa-Johnson. "Acoustic segmentation using switching state kalman filter." Acoustics, Speech, and Signal Processing, 2003. Proceedings.(ICASSP'03). 2003 IEEE International Conference on. vol. 1. IEEE, 2003. (Year: 2003).*
Veeraraghavan, Harini, Paul Schrater, and Nikolaos Papanikolopoulos. "Switching kalman filter-based approach for tracking and event detection at traffic intersections." Proceedings of the 2005 IEEE International Symposium on, Mediterrean Conference on Control and Automation. IEEE (Year: 2005).*
Stringa, Elena. "Morphological Change Detection Algorithms for Surveillance Applications." BMVC. 2000. (Year: 2000).*
Veeraraghavan, Harini, et al. "Development of a tracking-based monitoring and data collection system." (2005). (Year: 2005).*

* cited by examiner

METHOD FOR MOVING OBJECT DETECTION BY A KALMAN FILTER-BASED APPROACH

FIELD OF THE INVENTION

The present invention relates to the field of video processing. More specifically, the present invention relates to moving object detection.

BACKGROUND OF THE INVENTION

Subtraction of the Pre-determined (Completely) Static Background Image

The common approach for the video segmentation problem is subtraction of the predetermined, completely static background (BG) image from the new image just captured; the remaining pixels after subtraction are labeled as the foreground. The predetermined static BG image is generated at the very beginning of the segmentation process by capturing several images of the background scene and taking an average of those images. Therefore, during the generation of the pre-determined static BG image, the user needs to make sure that no moving objects (including the user) are present in the scene. Also, when the camera is displaced from its original position, the static BG image must be generated again. Therefore, this is the color-based method.

Off-line Learning Based Approach with Depth Information

A state-of-art real-time video segmentation is the method provided by Microsoft®, and it is implemented for Microsoft Kinect® for Windows® version 2, which captures a color image and its depth field simultaneously. They first create the database of human body masks with names of the human body parts labeled (such as, head, neck, shoulder, chest, arm, elbow, hand, stomach, hip, leg, knee, and foot) and also with depth information of the human bodies for thousands of different postures. Every time a depth field is captured, their method scans through all the local area of the captured depth field, and see if there are any good matches for the human postures stored in the database. When a good match is found, because the human posture comes with its depth information, the method roughly knows the range of depth where the human body is present. Simply, binarizing the depth field using the depth range information provides the human object mask, and this is the depth-based method.

SUMMARY OF THE INVENTION

Segmentation is the process of partitioning an image into regions under certain rules. One implementation is to separate human objects that appear in a sequence of images (video) from the background. The goal is to find humans and segment them out in real-time, fully automatic (with no user input), and the result is produced immediately after a new image is captured. Once the segmentation process is started, the method is constantly learning (or updating) the decision rule for segmenting out human objects from the background by itself. In some embodiments, learning involves automatic learning by the system comparing previous results with current results, analyzing the comparison and modifying parameters to determine if there is an improvement, and in some embodiments, learning involves receiving input from a user. Moving object detection by a Kalman filter-based approach roughly detects the region where moving objects are present.

In one aspect, a method programmed in a non-transitory memory of a device comprises acquiring video content, including storing the video content in the non-transitory memory of the device and analyzing the video content using a switching Kalman filter including implementing moving object determination which generates a result and performing a video processing operation on the video content using the result of the moving object determination. The method further comprises implementing learning, wherein learning includes comparing previous results and current results and modifying parameters utilized by the switching Kalman filter based on the comparison. Using the switching Kalman filter includes implementing a higher order scalar Kalman filter using a first order vector Kalman filter. Using the switching Kalman filter utilizes a kernel regression including a prediction matrix with a plurality of different assumptions to an unknown signal of interest. The result indicates a pixel state of whether a pixel is stationary or non-stationary. Detecting the pixel state utilizes a zeroth-order filter and a higher-order filter. When the switching Kalman filter indicates that the zeroth-order filter fits better to the video content, a pixel is determined to be in the stationary state now, and when the switching Kalman filter indicates that the higher-order filter fits better, then the pixel is determined to be in the non-stationary state now. Implementing moving object determination includes implementing a morphological image operation. Implementing moving object determination includes locating a face bounding box, scanning an image of the video content at a first line but skipping a pixel if the pixel is within the face bounding box, labeling a detected area as stationary and labeling a complementary area as non-stationary. Performing the video processing operation includes at least one of the following operations: real-time denoising, object tracking, human action recognition, and three dimensional model generation.

In another aspect, a system comprises an image sensor configured for acquiring video content and a processing device configured for processing the video content, including: analyzing the video content using a switching Kalman filter including implementing moving object determination which generates a result and performing a video processing operation on the video content using the result of the moving object determination and a display device configured for displaying the video content. The processing device is further configured for implementing learning, wherein learning includes comparing previous results and current results and modifying parameters utilized by the switching Kalman filter based on the comparison. Using the switching Kalman filter includes implementing a higher order scalar Kalman filter using a first order vector Kalman filter. Using the switching Kalman filter utilizes a kernel regression including a prediction matrix with a plurality of different assumptions to an unknown signal of interest. The result indicates the pixel state of whether the pixel is stationary or non-stationary. Detecting the pixel state utilizes a zeroth-order filter and a higher-order filter. When switching Kalman filter indicates that the zeroth-order filter fits better to the time series of a pixel of the video, the pixel is determined to be in the stationary state now, and when the switching Kalman filter indicates that the higher-order filter fits better, then the pixel is determined to be in a non-stationary state now. Implementing moving object determination includes implementing a morphological image operation. Implementing moving object determination includes locating a face bounding box, scanning the pixels in the top row of the image but skipping the pixels if there is any face bounding box below, labeling a detected area as stationary and labeling a complementary area as non-stationary. Performing the video processing operation includes at least one of the following operations: real-time denoising, object tracking, human action recognition, and three dimensional model generation.

In another aspect, an apparatus comprises a non-transitory memory for storing an application, the application for: acquiring video content, including storing the video content in the non-transitory memory of the device and analyzing the video content using a switching Kalman filter including implementing moving object determination which generates a result and performing a video processing operation on the video content using the result of the moving object determination and a processing component coupled to the memory, the processing component configured for processing the application. The application is further configured for implementing learning, wherein learning includes comparing previous results and current results and modifying parameters utilized by the switching Kalman filter based on the comparison. Using the switching Kalman filter includes implementing a higher order scalar Kalman filter using the first order vector Kalman filter. Using the switching Kalman filter utilizes a kernel regression including a prediction matrix with a plurality of different assumptions to an unknown signal of interest. The result indicates a pixel state of whether the pixel is stationary or non-stationary. Detecting the pixel state utilizes a zeroth-order filter and a higher-order filter. When the switching Kalman filter indicates that the zeroth-order filter fits better to the time series of a pixel of the video, a pixel is determined to be in a stationary state now, and when the switching Kalman filter indicates that the higher-order filter fits better, then the pixel is determined to be in a non-stationary state now. Implementing moving object determination includes implementing a morphological image operation. Implementing moving object determination includes locating a face bounding box, scanning an image of the video content at a first line but skipping a pixel if the pixel is within the face bounding box, labeling a detected area as stationary and labeling a complementary area as non-stationary. Performing the video processing operation includes at least one of the following operations: real-time denoising, object tracking, human action recognition, and three dimensional model generation.

DETAILED DESCRIPTION OF THE PREFERRED EMBODIMENT

Figure 1:
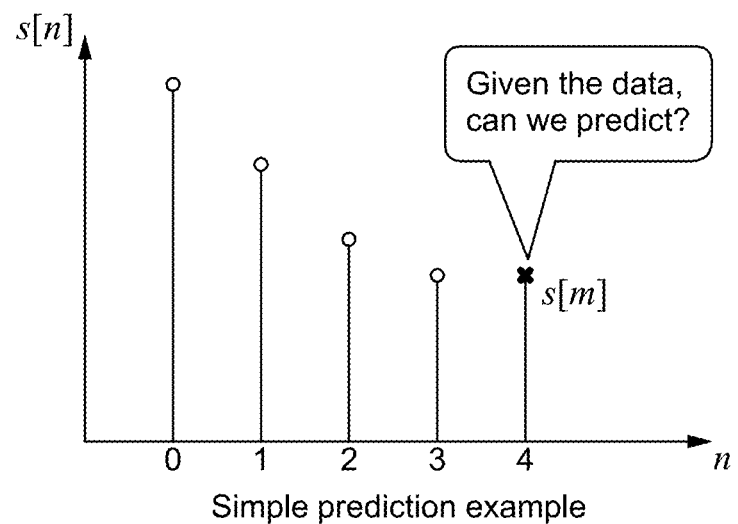
FIG. 1 illustrates a graph of a simple prediction example according to some embodiments.

Unlike the common color-based approach, the completely static BG image is not generated at the very beginning of the segmentation process, but the method constantly learns or updates the nearly static BG image during the segmentation process. This relaxation from completely static to nearly static is extremely beneficial because (1) the user does not need to step out from the camera scene, and (2) it does not matter even if the camera is accidentally displaced. Second, unlike the depth-based method, the method does not rely too much on the depth information. Because of the severe noise present in most depth map sensors, the boundaries of the foreground regions obtained relying heavily on depth value are often not smooth (which is not acceptable), and also because of the invalid depth values, there are some undesired holes within the foreground (human) object regions. The method described herein uses the depth information only in the region where it is reliable and is referred to as moving object detection by Kalman filter based approach for nearly static BG image updating.

Nearly Static Background Image Updating

An assumption for the background is that it is nearly static. To constantly update the background image, which regions (or pixels) of the new image just captured are in stationary state (or there is no moving object) are continuously detected. The detection of the pixel state is referred to as the "moving object detection." The simplest way would be to take the difference of the previous image and the current image, and if regions where the differences are significant, it is determined that some moving objects are present in the regions. However, due to the noise in pixel values, it is difficult to make good decisions for all the pixels.

There is a powerful statistical tool called Switching Kalman Filter (SKF). It is an application of Kalman filter, a widely used technique in navigation, detection, and estimation theory. The SKF performs pixel noise removal and pixel state estimation at the same time, if the filter parameters are designed appropriately. The method described herein includes the way to design the parameters using the non-parametric approach, called kernel regression. In the following sections, (1) Kalman filter, (2) switching Kalman filter, and (3) kernel regression are discussed, and it is explained how to design the filter parameters for the moving object detection.

First Order Vector Kalman Filter

Data Model $$s[n]=As[n-1]+u[n], u[n]\sim N(0,Q)$$

$$x[n]=Hs[n]+\varepsilon[n], n=1,\ldots,N, \varepsilon[n]\sim N(0,\Sigma)$$

Initial State $$s[0]\sim N(\mu,C) \Rightarrow \hat{s}[0]=\mu, M[0]=C$$

1. state prediction $$\hat{s}[n|n-1]=A\hat{s}[n-1]$$

2. minimum prediction MSE matrix (Estimator's covariance prediction)

$$P[n]=AM[n-1]A^T+Q$$

3. Kalman gain matrix $$K[n]=P[n]H^T(HP[n]H^T+\Sigma)^{-1}$$

4. Correction (Estimator update)

$$\hat{s}[n]=\hat{s}[n|n-1]+K[n](x[n]-H\hat{s}[n|n-1])$$

5. Minimum MSE matrix (Variance update)

$$M[n]=(1-K[n]H)P[n]$$

6. Likelihood of the prediction $$l[n]=N(x[n]|H\hat{s}[n|n-1], HP[n]H^T+\Sigma)$$

which results in:

$$(\hat{s}[n],M[n],l[n])<=f(\hat{s}[n-1],M[n-1],x[n],\theta)$$

The first order vector Kalman filter is shown above, where:

n is the time stamp starting 1 to N, s[n] is the state vector (p×1 where p is the vector dimension) at time n, A is the state transition matrix (p×p), u[n] is the driving noise assumed to be Gaussian with zero-mean and the covariance matrix Q (p×p),
x[n] is the noise ridden measurement (q×1 vector) at time n,
H is the emission matrix (q×p),
ε[n] is the measurement noise assumed to be Gaussian with zero-mean and the covariance matrix Σ (q×q),
s[0] is the initial value of s[n] assumed to be Gaussian with the mean vector μ (p×1) and the covariance C (p×p),
ŝ[n] is the estimate of s[n]
ŝ[n|n−1] is the prediction of ŝ[n] from the previous estimate ŝ[n−1]
P[n] is the minimum prediction mean squared error matrix (p×p) at time n,
M[n] is the minimum mean squared error matrix (p×p) at time n,
K[n] is Kalman gain matrix (p×q),
and, l[n] is the prediction likelihood that numerically determines how well the filter works.
θ is defined as equal to {A, H, Q, Σ, μ, C} as the parameter set of the Kalman filter.
A one time operation (step 1 to 6) of the Kalman filter is defined as f.
Using the first order vector Kalman filter, the p-th order scalar Kalman filter is implemented.

Each color component (red, green, blue) is processed separately, by letting x[n] be the red value (between 0 and 255) at time n, for example. In order to improve the filter performance, a higher order scalar Kalman filter is implemented, and it is able to be implemented using the first order vector Kalman filter.

p-th Order Gauss-Markov Process

Assuming that the new state s[n] is able to be estimated by a weighted sum of the last p states from s[n−p] to s[n−1] with weight coefficients a[1], . . . , a[p]:
s[n−p] to s[n−1] with weight coefficients a[1], . . . , a[p]:

$$s[n] = a[1]s[n-1] + a[2]s[n-2] + \ldots + a[p]s[n-p] + u[n]$$

It can be written in vector form as shown below, and it is the data model of the first order vector Kalman filter:

$$\underbrace{\begin{bmatrix} s[n-p+1] \\ s[n-p+2] \\ \vdots \\ s[n-1] \\ s[n] \end{bmatrix}}_{s[n]} = \underbrace{\begin{bmatrix} 0 & 1 & 0 & \ldots & 0 \\ 0 & 0 & 1 & \ldots & 0 \\ \vdots & \vdots & \vdots & \ddots & \vdots \\ 0 & 0 & 0 & \ldots & 1 \\ a[p] & a[p-1] & a[p-2] & \ldots & a[1] \end{bmatrix}}_{A} \underbrace{\begin{bmatrix} s[n-p] \\ s[n-p+1] \\ \vdots \\ s[n-2] \\ s[n-1] \end{bmatrix}}_{s[n-1]} + \underbrace{\begin{bmatrix} 0 \\ 0 \\ \vdots \\ 0 \\ u[n] \end{bmatrix}}_{u[n]}$$

The choice of weight coefficients a[1], . . . , a[p] decides the performance of the moving object detection.

Kernel Regression (KR)

KR is known as a non-parametric technique that provides a tool to estimate the unknown signal value at an arbitrary position, given a set of data points. Using this technique, the prediction matrix (e.g., the weight coefficients a[1], . . . , a[p]) is able to be designed with a variety of different assumptions to the unknown signal of interest. Assuming the last four state signals s[n] for n=0, . . . , 3 are available, s[m] for m=4 is predicted using s[n] as illustrated in FIG. 1.

Assuming that the state signals are locally smooth and at least N times differentiable along the time n, the relationship between s[n] for any n and s[m] by N-th order Taylor series is able to be expressed as:

$$s[n] \approx s[m] + s'[m](m-n) + \frac{1}{2!}s''[m](m-n)^2 + \ldots + \frac{1}{N!}s^{(N)}(m-n)^N$$

Knowing that the closer n and m are, the more reliable the relationship between s[n] and s[m] is, the s[m] is able to be found by the weighted least square method with giving the higher weights to the closer s[n] as:

$$\min \sum_n \left[ s[n] - s[m] - s'[m](m-n) - \frac{1}{2!}s''[m](m-n)^2 - \ldots \right]^2 G(m-n)$$

where G(m−n) is a Gaussian weight function defined as $$G(m-n) = \exp\left(-\frac{(m-n)^2}{2\sigma^2}\right)$$

with a choice of parameter σ².

For convenience, the weighted least square method in vector form is expressed as:

$$\min (s - Db)^T G (s - Db),$$

where $$s = \begin{bmatrix} \vdots \\ s[n] \\ \vdots \end{bmatrix}, D = \begin{bmatrix} \vdots & \vdots & \vdots & \ldots \\ 1 & m-n & (m-n)^2 & \ldots \\ \vdots & \vdots & \vdots & \ldots \end{bmatrix}$$

$$b = \begin{bmatrix} s[m] \\ s'[m] \\ s''[m] \\ \vdots \end{bmatrix}, G = \begin{bmatrix} \ddots & & \\ & G(m-n) & \\ & & \ddots \end{bmatrix}$$

The weighted least square provides an estimate as:

$$\hat{b} = \underbrace{(D^T G D)^{-1} D^T G}_{W} s = Ws$$

For the example shown in FIG. 1, the estimator provides s[4] using s[0], . . . , s[3] as:

$$\underbrace{\begin{bmatrix} \hat{s}[4] \\ \vdots \end{bmatrix}}_{\hat{b}} = \underbrace{[\,a[4] \quad a[3] \quad a[2] \quad a[1]\,]}_{w} \underbrace{\begin{bmatrix} s[3] \\ s[2] \\ s[1] \\ s[0] \end{bmatrix}}_{s}$$

In general, using the latest p state signals, the next state s[n] is able to be estimated or predicted as:

$$\underbrace{\begin{bmatrix} \hat{s}[n] \\ \vdots \end{bmatrix}}_{\hat{b}} = \underbrace{[a[p] \quad a[p-1] \quad \ldots \quad a[1]]}_{w} \underbrace{\begin{bmatrix} s[n-p] \\ \ldots \\ s[n-2] \\ s[n-1] \end{bmatrix}}_{s}$$

In this way, with the choice of the order of Taylor series (or the basis matrix D) and the width parameter $\sigma^2$ of Gaussian weight function G(m−n) or the weight matrix G), the prediction coefficients a[1], . . . , a[p] are able to be designed for the prediction matrix A of the Kalman filter.

$$\underbrace{\begin{bmatrix} s[n-p+1] \\ s[n-p+2] \\ \vdots \\ s[n-1] \\ s[n] \end{bmatrix}}_{s[n]} =$$

$$\underbrace{\begin{bmatrix} 0 & 1 & 0 & \ldots & 0 \\ 0 & 0 & 1 & \ldots & 0 \\ \vdots & \vdots & \vdots & \ddots & \vdots \\ 0 & 0 & 0 & \ldots & 1 \\ a[p] & a[p-1] & a[p-2] & \ldots & a[1] \end{bmatrix}}_{A} \underbrace{\begin{bmatrix} s[n-p] \\ s[n-p+1] \\ \vdots \\ s[n-2] \\ s[n-1] \end{bmatrix}}_{s[n-1]} + \underbrace{\begin{bmatrix} 0 \\ 0 \\ \vdots \\ 0 \\ u[n] \end{bmatrix}}_{u[n]}$$

Switching Kalman Filter (SKF)

A brief summary of the step-by-step procedure of SKF includes:

Multiple Data Model $s_i[n] = A_i s_i[n-1] + u_i[n]$, $u_i[n] \sim N(0, Q)$ $x[n] = H_i s_i[n] + \varepsilon_i[n]$, $n = 1, \ldots, N$, $\varepsilon_i[n] \sim N(0, \Sigma)$ Initial State $s_i[0] \sim N(\mu_i, C) \Rightarrow \hat{s}_i[0] = \mu_i, M_i[0] = C_i$ 1. Filtering for all i and j $(\hat{s}_{ij}[n], M_{ij}[n], l_{ij}[n]) <= f(\hat{s}_i[n-1], M_i[n-1], x[n], \theta_j)$ 2. Joint state probability of i and j and normalization $$\rho'_{ij}[n] = \ell_{ij}[n] \vartheta_{ij} \eta_i[n-1], \quad \rho_{ij}[n] = \frac{\rho'_{ij}[n]}{\sum_i \sum_j \rho'_{ij}[n]}$$

3. Marginal state probability $$\eta_j[n] = \sum_i \rho_{ij}[n]$$

4. Mixing coefficients $$w_{ij} = \frac{\rho_{ij}[n]}{\eta_j[n]}$$

5. Collapse (Merging)

$$\hat{s}_j[n] = \sum_j w_{ij} \hat{s}_{ij}[n], \quad M_i[n] = \sum_j w_{ij} \{M_{ij} + (\hat{s}_i[n] - \hat{s}_{ij}[n])(\hat{s}_i[n] - \hat{s}_{ij}[n])^T\}$$

6. Signal state detection $$\arg\max_j \eta_j[n]$$

SKF is an extended version of the Kalman filter. While, in the Kalman filter, only one data model is used for the underlying signal, in SKF, multiple data models are used in order to handle complicated signals better.

The subscript i is the index number of the different data model, and for each data model, Kalman filters with different parameter sets $\theta_i = \{A_i, H_i, Q_i, \Sigma_i, \mu_i, C_i\}$ are generated.

By updating the state vectors $\hat{s}_i[n-1]$ and the minimum MSE matrix $M_i[n-1]$ with the new incoming data x[n] (step 1 to 6), SKF provides the smoothed version of the incoming signal x[n], and the current signal states (the meaning of the signal states depends on how the filter parameters $\theta_i$ are set).

Filter Parameters for Pixel State Detection

The pixel state detection method uses the SKF. The method determines in which state, stationary or non-stationary, each pixel is now. To detect the pixel state, Kalman filters are generated with two different choices of the prediction coefficient set using the kernel regression technique. A zeroth-order filter: one with setting the order of Taylor series to zero, for the signal when it is in a stationary state. A higher-order filter: the other with setting the order of Taylor series to one, for the signal when it is in non-stationary state.

The time series of pixels (each color component—red, green, blue—separately) is processed by an SKF with the different Kalman filters. When the switching Kalman filter indicates that the zeroth-order filter fits better to the incoming signal, the pixel is determined to be in the stationary state now, or the higher-order filter fits better, then the pixel is determined to be in the non-stationary state now. The non-stationary pixels show the rough location and the size of the moving objects in the scene.

Moving Object Detection Method

Figure 2:
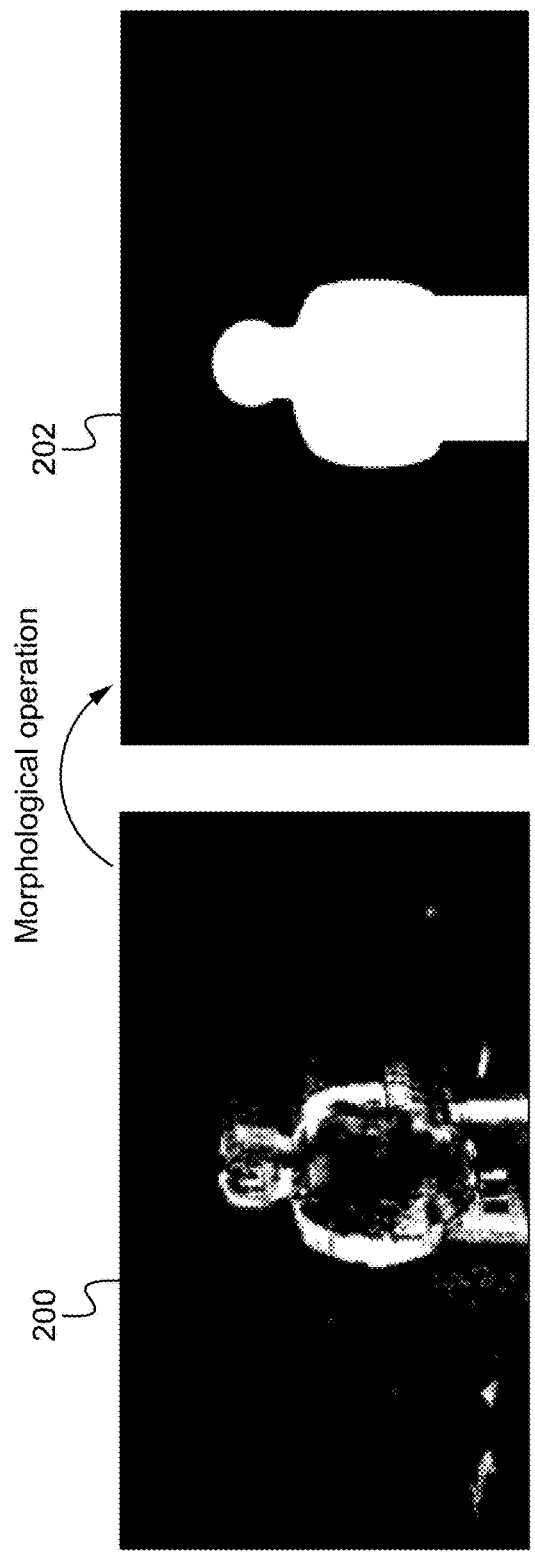
FIG. 2 illustrates images of pixel state detection results according to some embodiments.

Due to the pixel-by-pixel processing, SKF is able to find only the outline of the moving objects. A typical pixel state detection result by SKF of the moving (standing) human object is shown in image 200 in FIG. 2. To improve the performance of the moving object detection further, a morphological image operation is implemented to have an image such as image 202 in FIG. 2. In image 200, the black area is the stationary pixels, and the other areas are non-stationary pixels. In image 202, the white is the moving object, and the black is the static background region.

The morphological operation is the following two-step approach. The closing operation to connect nearby non-stationary pixels (dilation operation followed by erosion operation) is applied. After the closing operation, the image is roughly partitioned into several regions, and any sub-regions where human faces are present are determined as the regions of moving objects by the filling operation.

Figure 3:
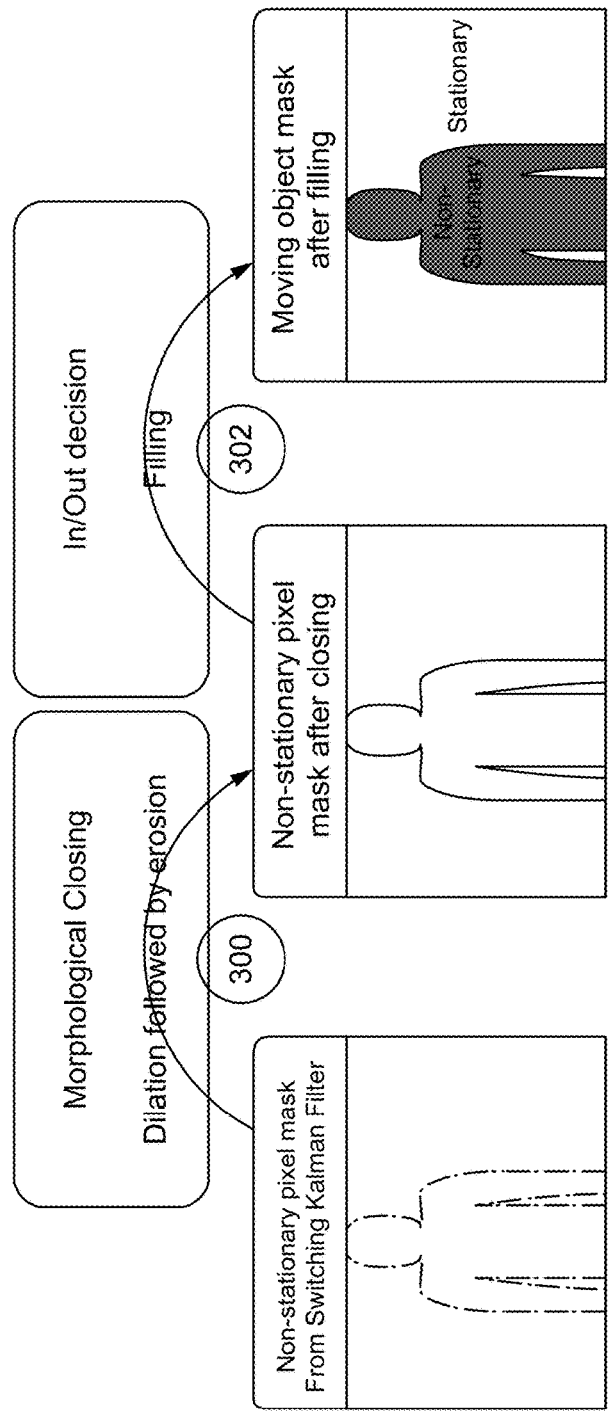
FIG. 3 illustrates a diagram of a morphological operation according to some embodiments.

FIG. 3 illustrates a diagram of the morphological operation according to some embodiments. Morphological closing is utilized in the step 300, which connects nearby non-stationary pixels using a dilation operation followed by an erosion operation. Then, the image is roughly partitioned into several regions, and it is determined if any sub-regions where human faces are present as the regions of moving objects by the filling operation in the step 302.

In/Out decision: all pixels in the first line that are stationary (shown in blue in FIG. 4) and have no face bounding box below them are labeled as a moving object, as well as any other stationary pixel (shown in blue) that is connected to such stationary pixel. Any pixel that is not labeled as stationary is labeled as a moving object.

Figure 4:
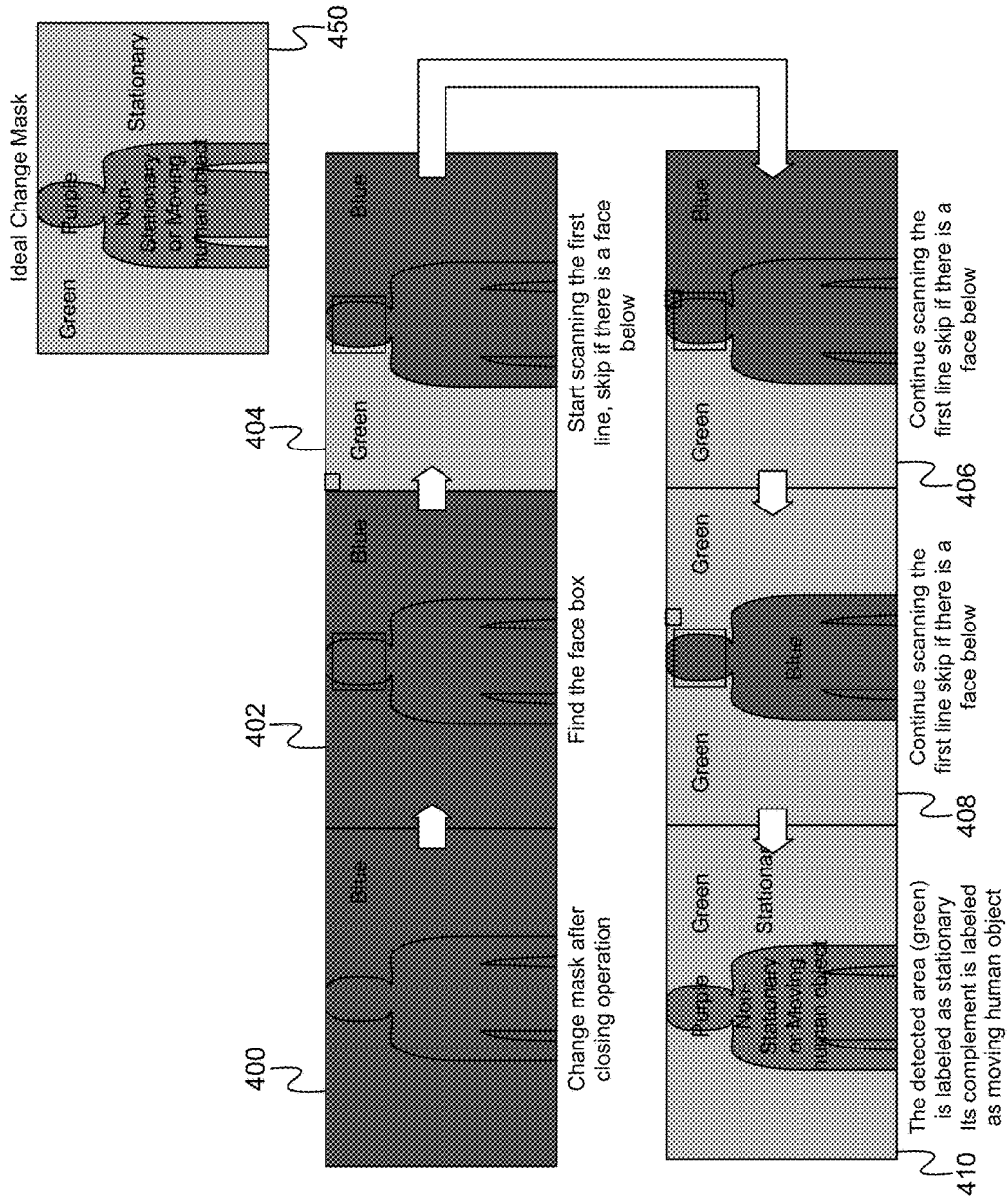
FIG. 4 illustrates a diagram of moving object detection method according to some embodiments.

FIG. 4 illustrates a diagram of moving object detection method according to some embodiments. In the step 400, the mask is changed after the closing operation. In the step 402, a face bounding box is found. The face bounding box is able to be found in any manner such as detecting eyes and mouth features within a round shape. In the step 404, the scanning starts at the first line but is skipped if there is a face below (e.g., within the current scanning area). In the step 406, the scanning continues but is skipped if there is a face below. In the step 408, the scanning continues still but is skipped if there is a face below. In the step 410, the detected area (green) is labeled as stationary, and its complementary area is labeled as moving human object (or non-stationary). In some embodiments, fewer or additional steps are implemented. In some embodiments, the order of the steps is modified. The diagram 450 shows an ideal change mask.

Although the current approach gets rid of all of the holes in the moving object, since the moving object mask is used to estimate the nearly static background image, the errors will not negatively affect the video segmentation performance.

Figure 5:
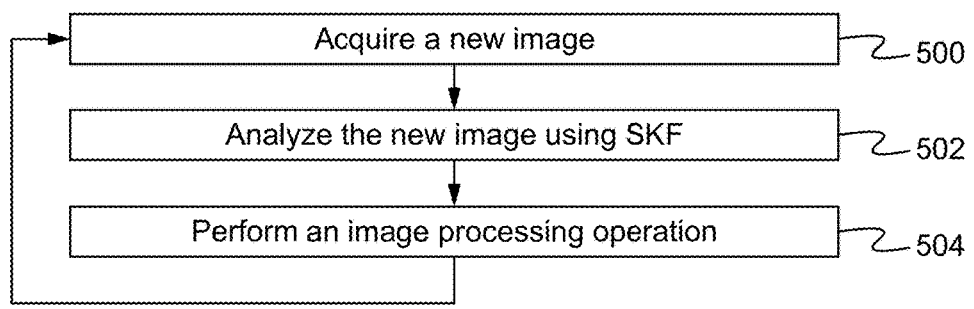
FIG. 5 illustrates a flowchart of the real-time moving object detection method according to some embodiments.

FIG. 5 illustrates a flowchart of the real-time moving object detection method according to some embodiments. The "real-time" means that the method processes the new input image as soon as available and produces the result immediately as described next. In the step 500, a new input image is acquired. In the step 502, the new input image is analyzed using SKF including implementing moving object determination. In the step 504, an image processing operation is performed (e.g., denoising, object tracking, modeling) on the image. This process is repeated until the program is terminated. In some embodiments, fewer or additional steps are implemented. In some embodiments, the order of the steps is modified.

Figure 6:
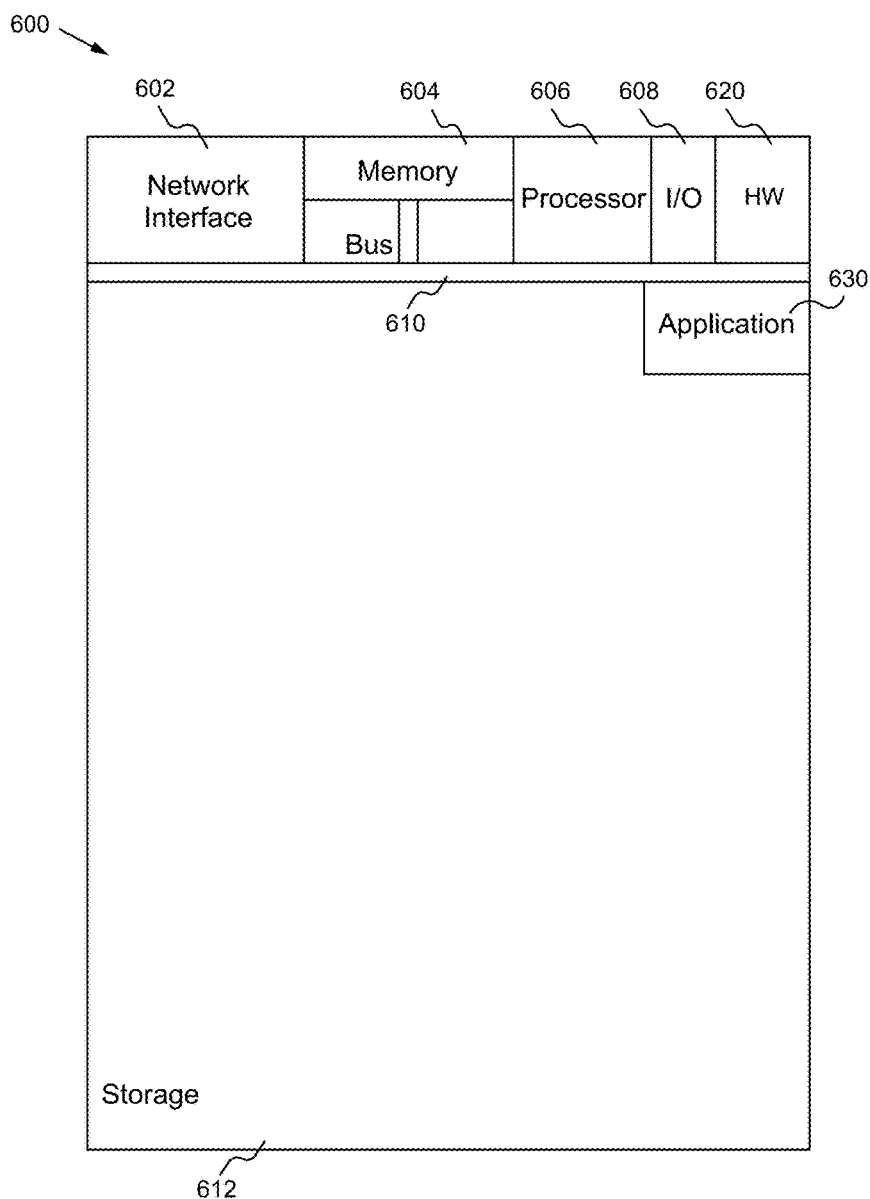
FIG. 6 illustrates a block diagram of an exemplary computing device configured to implement the moving object detection method according to some embodiments.

FIG. 6 illustrates a block diagram of an exemplary computing device configured to implement the moving object detection method according to some embodiments. The computing device 600 is able to be used to acquire, store, compute, process, communicate and/or display information such as images and videos. In general, a hardware structure suitable for implementing the computing device 600 includes a network interface 602, a memory 604, a processor 606, I/O device(s) 608, a bus 610 and a storage device 612. The choice of processor is not critical as long as a suitable processor with sufficient speed is chosen. The memory 604 is able to be any conventional computer memory known in the art. The storage device 612 is able to include a hard drive, CDROM, CDRW, DVD, DVDRW, High Definition disc/drive, ultra-HD drive, flash memory card or any other storage device. The computing device 600 is able to include one or more network interfaces 602. An example of a network interface includes a network card connected to an Ethernet or other type of LAN. The I/O device(s) 608 are able to include one or more of the following: keyboard, mouse, monitor, screen, printer, modem, touchscreen, button interface and other devices. Moving object detection application(s) 630 used to perform the moving object detection method are likely to be stored in the storage device 612 and memory 604 and processed as applications are typically processed. More or fewer components shown in FIG. 6 are able to be included in the computing device 600. In some embodiments, moving object detection hardware 620 is included. Although the computing device 600 in FIG. 6 includes applications 630 and hardware 620 for the moving object detection method, the moving object detection method is able to be implemented on a computing device in hardware, firmware, software or any combination thereof. For example, in some embodiments, the moving object detection applications 630 are programmed in a memory and executed using a processor. In another example, in some embodiments, the moving object detection hardware 620 is programmed hardware logic including gates specifically designed to implement the moving object detection method.

In some embodiments, the moving object detection application(s) 630 include several applications and/or modules. In some embodiments, modules include one or more submodules as well. In some embodiments, fewer or additional modules are able to be included.

Examples of suitable computing devices include a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, a smart phone, a portable music player, a tablet computer, a mobile device, a video player, a video disc writer/player (e.g., DVD writer/player, high definition disc writer/player, ultra high definition disc writer/player), a television, an augmented reality device, a virtual reality device, a home entertainment system, smart jewelry (e.g., smart watch) or any other suitable computing device.

To utilize the moving object detection method, a device such as a digital video camera is able to be used to acquire a video. The moving object detection method is automatically implemented during or after acquiring a video such as during playback of the video. The moving object detection method is able to be implemented automatically without user involvement.

In operation, the relaxation from completely static to nearly static is extremely beneficial because (1) the user does not need to step out from the camera scene, and (2) it does not matter even if the camera is accidentally displaced. Second, unlike the depth-based method, the moving object detection method does not rely too much on the depth information.

There are many possible implementations of the moving object detection method.

Object Tracking and Object Motion Detection

The method described herein is applicable to motion detection of any objects such as human faces and human bodies.

Real-time Video Denoising

The method described herein is able to be regarded as a real-time curve fitting or a real-time signal smoothing technique, and it is a minimum mean squared error (MMSE) estimator.

Human Action Recognition

The application of the human body tracking and motion detection is extendable to human action recognition by labeling (or classifying) motion patterns.

3D Model Generation of the Background and Foreground Objects

Using segmentation results of the moving human objects in video and depth information, a 3D model of the foreground objects (e.g., human faces and bodies online in real-time) and the background objects is able to be generated.

Some Embodiments of a Method for Moving Object Detection by A Kalman Filter-Based Approach 1. A method programmed in a non-transitory memory of a device comprising:

a. acquiring video content, including storing the video content in the non-transitory memory of the device; and
b. analyzing the video content using a switching Kalman filter including implementing moving object determination which generates a result; and
c. performing a video processing operation on the video content using the result of the moving object determination.

2. The method of clause 1 further comprising implementing learning, wherein learning includes comparing previous results and current results and modifying parameters utilized by the switching Kalman filter based on the comparison.

3. The method of clause 1 wherein using the switching Kalman filter includes implementing a higher order scalar Kalman filter using a first order vector Kalman filter.

4. The method of clause 1 wherein using the switching Kalman filter utilizes a kernel regression including a prediction matrix with a plurality of different assumptions to an unknown signal of interest.

5. The method of clause 1 wherein the result indicates a pixel state of whether a pixel is stationary or non-stationary.

6. The method of clause 5 wherein detecting the pixel state utilizes a zeroth-order filter and a higher-order filter.

7. The method of clause 6 wherein when the switching Kalman filter indicates that the zeroth-order filter fits better to the video content, a pixel is determined to be in the stationary state now, and when the switching Kalman filter indicates that the higher-order filter fits better, then the pixel is determined to be in the non-stationary state now.

8. The method of clause 1 wherein implementing moving object determination includes implementing a morphological image operation.

9. The method of clause 1 wherein implementing moving object determination includes
   i. locating a face bounding box;
   ii. scanning an image of the video content at a first line but skipping a pixel if the pixel is within the face bounding box;
   iii. labeling a detected area as stationary; and
   iv. labeling a complementary area as non-stationary.

10. The method of clause 1 wherein performing the video processing operation includes at least one of the following operations: real-time denoising, object tracking, human action recognition, and three dimensional model generation.

11. A system comprising:
   a. an image sensor configured for acquiring video content; and
   b. a processing device configured for processing the video content, including:
      i. analyzing the video content using a switching Kalman filter including implementing moving object determination which generates a result; and
      ii. performing a video processing operation on the video content using the result of the moving object determination; and
   c. a display device configured for displaying the video content.

12. The system of clause 11 wherein the processing device is further configured for implementing learning, wherein learning includes comparing previous results and current results and modifying parameters utilized by the switching Kalman filter based on the comparison.

13. The system of clause 11 wherein using the switching Kalman filter includes implementing a higher order scalar Kalman filter using a first order vector Kalman filter.

14. The system of clause 11 wherein using the switching Kalman filter utilizes a kernel regression including a prediction matrix with a plurality of different assumptions to an unknown signal of interest.

15. The system of clause 11 wherein the result indicates a pixel state of whether a pixel is stationary or non-stationary.

16. The system of clause 15 wherein detecting the pixel state utilizes a zeroth-order filter and a higher-order filter.

17. The system of clause 16 wherein when the switching Kalman filter indicates that the zeroth-order filter fits better to a time series of a pixel of the video content, the pixel is determined to be in the stationary state now, and when the switching Kalman filter indicates that the higher-order filter fits better, then the pixel is determined to be in the non-stationary state now.

18. The system of clause 11 wherein implementing moving object determination includes implementing a morphological image operation.

19. The system of clause 11 wherein implementing moving object determination includes
   i. locating a face bounding box;
   ii. scanning pixels in the top row of an image but skipping the pixels if there is any face bounding box below;
   iii. labeling a detected area as stationary; and
   iv. labeling a complementary area as non-stationary.

20. The system of clause 11 wherein performing the video processing operation includes at least one of the following operations: real-time denoising, object tracking, human action recognition, and three dimensional model generation.

21. An apparatus comprising:
   a. a non-transitory memory for storing an application, the application for:
      i. acquiring video content, including storing the video content in the non-transitory memory of the device; and
      ii. analyzing the video content using a switching Kalman filter including implementing moving object determination which generates a result; and
      iii. performing a video processing operation on the video content using the result of the moving object determination; and
   b. a processing component coupled to the memory, the processing component configured for processing the application.

22. The apparatus of clause 21 wherein the application is further configured for implementing learning, wherein learning includes comparing previous results and current results and modifying parameters utilized by the switching Kalman filter based on the comparison.

23. The apparatus of clause 21 wherein using the switching Kalman filter includes implementing a higher order scalar Kalman filter using a first order vector Kalman filter.

24. The apparatus of clause 21 wherein using the switching Kalman filter utilizes a kernel regression including a prediction matrix with a plurality of different assumptions to an unknown signal of interest.

25. The apparatus of clause 21 wherein the result indicates a pixel state of whether a pixel is stationary or non-stationary.

26. The apparatus of clause 25 wherein detecting the pixel state utilizes a zeroth-order filter and a higher-order filter.

27. The apparatus of clause 26 wherein when the switching Kalman filter indicates that the zeroth-order filter fits better to a time series of a pixel of the video, the pixel is determined to be in a stationary state now, and when the switching Kalman filter indicates that the higher-order filter fits better, then the pixel is determined to be in a non-stationary state now.

28. The apparatus of clause 21 wherein implementing moving object determination includes implementing a morphological image operation.

29. The apparatus of clause 21 wherein implementing moving object determination includes
   i. locating a face bounding box;
   ii. scanning an image of the video content at a first line but skipping a pixel if the pixel is within the face bounding box;
   iii. labeling a detected area as stationary; and
   iv. labeling a complementary area as non-stationary.

30. The apparatus of clause 21 wherein performing the video processing operation includes at least one of the following operations: real-time denoising, object tracking, human action recognition, and three dimensional model generation.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:

1. A method programmed in a non-transitory memory of a device comprising:
   a. acquiring video content, including storing the video content in the non-transitory memory of the device; and
   b. analyzing the video content using a switching Kalman filter including implementing moving object determination which generates a result; and
   c. performing a video processing operation on the video content using the result of the moving object determination, wherein the result indicates a pixel state of whether a pixel is stationary or non-stationary, wherein detecting the pixel state utilizes a zeroth-order filter and a higher-order filter, wherein implementing moving object determination includes
      i. locating a face bounding box;
      ii. scanning an image of the video content at a first line but skipping a pixel if the pixel is within the face bounding box;
      iii. labeling a detected area as stationary; and
      iv. labeling a complementary area as non-stationary.

2. The method of claim 1 further comprising implementing learning, wherein learning includes comparing previous results and current results and modifying parameters utilized by the switching Kalman filter based on the comparison.

3. The method of claim 1 wherein using the switching Kalman filter includes implementing a higher order scalar Kalman filter using a first order vector Kalman filter.

4. The method of claim 1 wherein using the switching Kalman filter utilizes a kernel regression including a prediction matrix with a plurality of different assumptions to an unknown signal of interest.

5. The method of claim 1 wherein when the switching Kalman filter indicates that the zeroth-order filter fits better to the video content, a pixel is determined to be in the stationary state now, and when the switching Kalman filter indicates that the higher-order filter fits better, then the pixel is determined to be in the non-stationary state now.

6. The method of claim 1 wherein implementing moving object determination includes implementing a morphological image operation.

7. The method of claim 1 wherein performing the video processing operation includes at least one of the following operations: real-time denoising, object tracking, human action recognition, and three dimensional model generation.

8. A system comprising:
   a. an image sensor configured for acquiring video content; and
   b. a processing device configured for processing the video content, including:
      i. analyzing the video content using a switching Kalman filter including implementing moving object determination which generates a result; and
      ii. performing a video processing operation on the video content using the result of the moving object determination, wherein the result indicates a pixel state of whether a pixel is stationary or non-stationary, wherein detecting the pixel state utilizes a zeroth-order filter and a higher-order filter, wherein implementing moving object determination includes
         (1) locating a face bounding box;
         (2) scanning pixels in the top row of an image but skipping the pixels if there is any face bounding box below;
         (3) labeling a detected area as stationary; and
         (4) labeling a complementary area as non-stationary; and
   c. a display device configured for displaying the video content.

9. The system of claim 8 wherein the processing device is further configured for implementing learning, wherein learning includes comparing previous results and current results and modifying parameters utilized by the switching Kalman filter based on the comparison.

10. The system of claim 8 wherein using the switching Kalman filter includes implementing a higher order scalar Kalman filter using a first order vector Kalman filter.

11. The system of claim 8 wherein using the switching Kalman filter utilizes a kernel regression including a prediction matrix with a plurality of different assumptions to an unknown signal of interest.

12. The system of claim 8 wherein when the switching Kalman filter indicates that the zeroth-order filter fits better to a time series of a pixel of the video content, the pixel is determined to be in the stationary state now, and when the switching Kalman filter indicates that the higher-order filter fits better, then the pixel is determined to be in the non-stationary state now.

13. The system of claim 8 wherein implementing moving object determination includes implementing a morphological image operation.

14. The system of claim 8 wherein performing the video processing operation includes at least one of the following operations: real-time denoising, object tracking, human action recognition, and three dimensional model generation.

15. An apparatus comprising:
   a. a non-transitory memory for storing an application, the application for:
      i. acquiring video content, including storing the video content in the non-transitory memory of the device; and ii. analyzing the video content using a switching Kalman filter including implementing moving object determination which generates a result; and
iii. performing a video processing operation on the video content using the result of the moving object determination, wherein the result indicates a pixel state of whether a pixel is stationary or non-stationary, wherein detecting the pixel state utilizes a zeroth-order filter and a higher-order filter, wherein implementing moving object determination includes
(1) locating a face bounding box;
(2) scanning an image of the video content at a first line but skipping a pixel if the pixel is within the face bounding box;
(3) labeling a detected area as stationary; and
(4) labeling a complementary area as non-stationary; and
b. a processing component coupled to the memory, the processing component configured for processing the application.

16. The apparatus of claim 15 wherein the application is further configured for implementing learning, wherein learning includes comparing previous results and current results and modifying parameters utilized by the switching Kalman filter based on the comparison.

17. The apparatus of claim 15 wherein using the switching Kalman filter includes implementing a higher order scalar Kalman filter using a first order vector Kalman filter.

18. The apparatus of claim 15 wherein using the switching Kalman filter utilizes a kernel regression including a prediction matrix with a plurality of different assumptions to an unknown signal of interest.

19. The apparatus of claim 15 wherein when the switching Kalman filter indicates that the zeroth-order filter fits better to a time series of a pixel of the video, the pixel is determined to be in a stationary state now, and when the switching Kalman filter indicates that the higher-order filter fits better, then the pixel is determined to be in a non-stationary state now.

20. The apparatus of claim 15 wherein implementing moving object determination includes implementing a morphological image operation.

21. The apparatus of claim 15 wherein performing the video processing operation includes at least one of the following operations: real-time denoising, object tracking, human action recognition, and three dimensional model generation.

* * * * *